United States Patent

[11] 3,552,582

| [72] | Inventor | Klaus E. Hanft |
| | | Selb, Bavaria, Germany |
| [21] | Appl. No. | 813,846 |
| [22] | Filed | Apr. 7, 1969 |
| [45] | Patented | Jan. 5, 1971 |
| [73] | Assignee | Gebruder Netzsch, Maschinenfabrik |
| | | Selb, Bavaria, Germany |
| | | a corporation of Bavaria |
| [32] | Priority | Dec. 21, 1968 |
| [33] | | Germany |
| [31] | | No. P1,816,787 |

[54] APPARATUS FOR INVERTING FRAGILE ARTICLES
9 Claims, 9 Drawing Figs.

[52] U.S. Cl. ................................................ 214/1
[51] Int. Cl. .................................................. B65g 69/00
[50] Field of Search ....................................... 198/33R4;
214/1R, 85C, 1B4, 1BS4

[56] References Cited
UNITED STATES PATENTS
3,047,166  7/1962  Lamp et al. .................. 198/33(4)X FOREIGN PATENTS
1,272,398  8/1961  France ........................ 214/1(R)

*Primary Examiner*—Gerald M. Forlenza
*Assistant Examiner*—Frank E. Werner
*Attorney*—Karl W. Flocks ABSTRACT: Apparatus particularly adapted for transferring or handling fragile articles such as ceramic beakers, cups and the like in which it is desired to take the articles from a production in one attitude and invert the articles and deposit them for subsequent manufacturing procedures in which a common support member pivotally supports at opposite ends power-operated handling and transfer assemblies in which one includes a fluid motor assembly and suction cup and the other includes a spring-urged base and gripping fingers, and in which a motor on the support member coordinates and causes the respective assemblies to move through a cycle including picking up or vertically depositing the fragile articles, and transferring the articles when the assemblies are disposed in a horizontal attitude whereby assemblies pivot in an arc of 90° respectively and the articles are inverted 180°.

APPARATUS FOR INVERTING FRAGILE ARTICLES

This invention relates to manipulating apparatus for transferring delicate articles, for example, ceramic, molded cups, beakers, etc. from one position to another, including a suction head to grip the article by suction and a holder to receive the article from the suction head in one position and deliver it at another position. The suction head may serve to lift one article at a time from a support, in particular a mold, and transfer it to the holder which places it on a conveyor, a further processing machine or the like, the suction head and the holder having together inverted the article.

In prior art apparatus of this type, used to invert ceramic plates which are dried to leather-hardness or color, the suction head is movable up and down and arranged so that a plate gripped by it by suction can be raised parallel with itself into a position in which a holder mounted on a pivoted arm can be brought under the plate in order to accept it from the suction head. The holder which also incorporates a suction head, must then be pivoted through 180° before it can deposit the plate, which now has its upper face pointing upwards, on a conveyor which carries the plate through a dryer to dry the article to a white color. The efficiency of this prior art apparatus is limited by the fact that it takes a while before a sufficient vacuum has developed in the second suction head (on the pivoted arm) to grip the plate sufficiently firmly to hold it during the subsequent pivoting through 180°, which may involve considerable angular acceleration and retardation. Only when this vacuum has fully developed in the second suction head can the first (vertically movable) suction head be raised into a position in which it clears the way for the pivoting of the pivot arm, and only then can pivoting of the pivot arm begin.

The invention is primarily concerned with overcoming this disadvantage, and in a preferred form provides apparatus for transferring and simultaneously inverting delicate objects which requires little time for the whole turning process and transfers the article without exposing it to excessive stresses. The apparatus is intended particularly to be suitable for leather-hard dried beakers (not fully baked) and similar objects made from ceramic composition, in which the area of the bottom, on which a suction head might engage, is small in proportion to the weight of an individual object.

According to the present invention, the holder includes a member, referred to herein as a cushion, arranged to engage a face of the article held by the suction head and to yield resiliently to the pressure thereof, and at least one finger which then engages behind the edge of the article to prevent it from moving away from the cushion until retracted.

In one form of the invention the suction head and the holder are mounted respectively on the free ends of two arms each pivoting about its opposite end between a position in which the arms hang down vertically and in which the suction head picks up an article and the holder deposits an article, and a position in which the arms extend horizontally towards one another and in line with one another and the holder receives an article from the suction head. Thus the total necessary pivoting of the article through 180° is so subdivided into two pivoting actions through 90° each, that the paths of movement of the suction head and of the retaining device do not intersect. For this purpose a first crank turning with one arm may be connected by a link to a second crank inclined at 90° to the first crank and turning with the other arm to cause the two arms to swing in opposite directions.

In order to be able to bring the suction head for transferring the object close to the retaining device, provision could be made for the pivot mountings of the two pivot arms to be guided movably towards each other. It has, however, been found advantageous if, according to a further feature of the invention, at least one pivot arm comprises a device for varying the distance between its pivot axis and the suction head or the finger of the retaining device. For example, the pivot arm of the suction head may be constituted by a pneumatic piston and cylinder ram. Furthermore, it is advantageous if the arm carrying the holder comprises a rod on the end of which the cushion is movably mounted and connected upon by a spring, and, extending parallel with the rod a pneumatic ram to the free end of which is pivoted a member carrying the fingers.

Further features and details of the invention will be apparent from the following description of one specific embodiment, given by way of example, with reference to the accompanying drawings forming a part thereof, in which.

Figure 1:
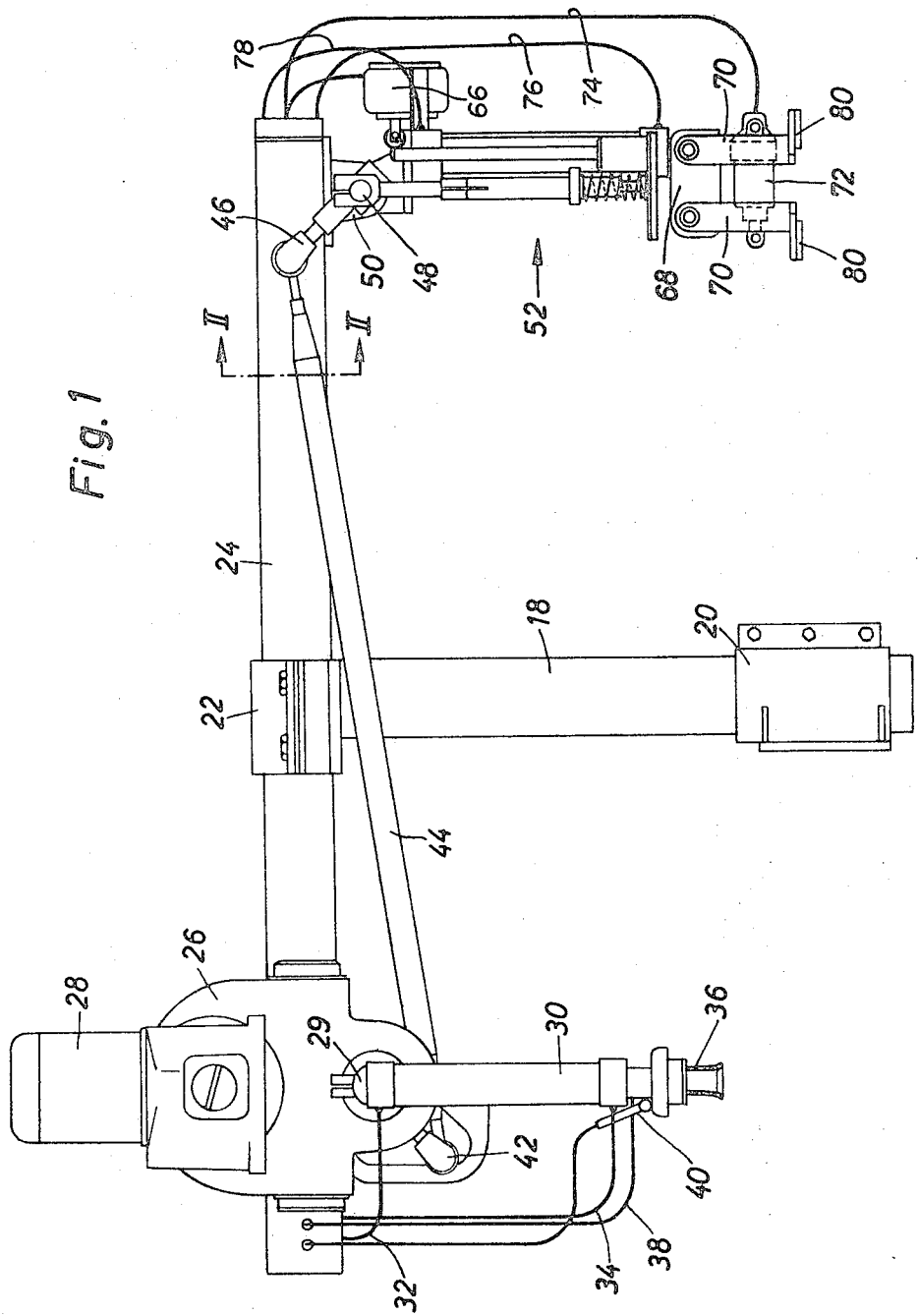
FIG. 1 is a side view of a manipulating apparatus according to the invention.

The apparatus illustrated is supplied i with leather-hard dried beakers 10, each of which arrives in a mold 12 on a conveyor 14, only indicated in the drawing, with its open mouth rim pointing upwards; see FIGS. 3a—3g, The apparatus serves to lift each beaker out of its mold, invert it, and deposit it with its mouth pointing downwards on to a spindle head 16 shaped to fit the inside shape of the beaker; the beaker being cleaned on the said spindle head 16 and if necessary, receiving a handle at this station. The spindle head 16 is adapted to be rotated about its vertical axis and is mounted on an apparatus, not shown, for further processing of the beaker; this apparatus may be a circular table machine, for example, with further spindle heads 16 which are fed step-by-step in synchronism with the conveyor 14.

The manipulating apparatus illustrated comprises a column 18; FIG. 1, which is adjustable in height and mounted in a support 20. Axially adjustably fitted at the top end of the column 18, in a holder 22, is a horizontal, tubular beam 24. Mounted on the tubular beam 24, on the left in FIG. 1, is a reduction gearing 26 driven by a flange mounted electric motor 28. Mounted on each end of a transverse output shaft 29 of the gear mechanism 26 and directed radially away from the ends of shaft 29 are the cylinders of pneumatic piston and cylinder rams 30. Inside the gear unit 26 are suitable limit switches (not shown) which so control the motor 28 that, when the motor is operated, each ram 30 is swung from its vertical depending position shown in FIG. 1 counterclockwise to a horizontal position; see FIG. 3d, etc., and during a subsequent cycle, is returned to the original vertical position.

The rams 30 are double acting; including two working chambers connected to a compressed-air source through pipes 32 and 34, each of which contains an adjustable throttle, and through valves which are not shown. Mounted on the piston rod of each piston ram 30 is a resilient suction head 36 which is shaped like an open-bottomed beaker, its interior being connected to a vacuum source through a conduit 38. In its extreme retracted position, shown in FIG. 1, the suction head 36 engages and closes a limit switch 40 mounted on the cylinder.

The output shaft 29 of the reduction gearing 26, serving as a pivoting axis for the rams 30, carries a crank 42 connected by a link 44 to a crank 46 carried by a shaft 48, mounted in bearings 50 at the other end of the tubular beam 24.

Figure 2:
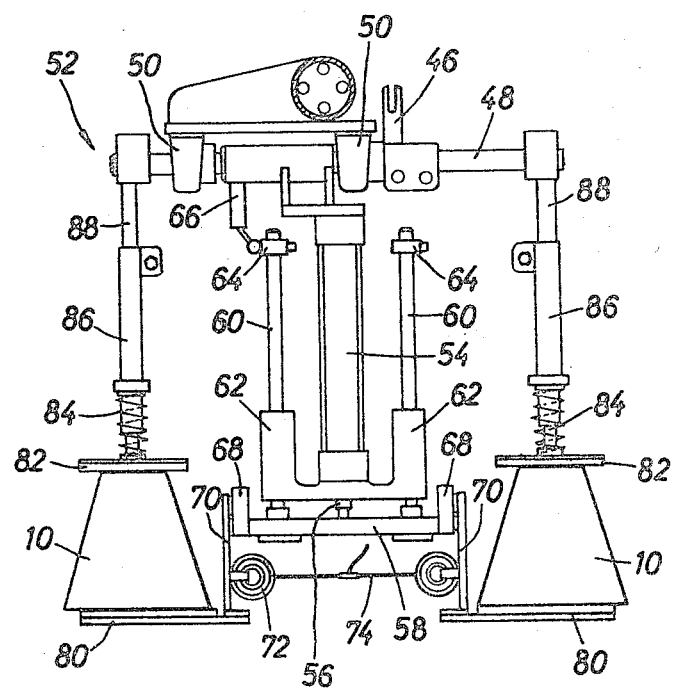
FIG. 2 is a section taken generally on the line II–II of FIG. 1.

Mounted on the shaft 48 is a pivot arm generally designated 52; shown in detail in FIG. 2. The pivot arm 52 is constructed so that it can simultaneously accept two beakers 10 from the two suction heads 36, only one of which can be seen in FIG. 1. The pivot arm 52 comprises a piston and cylinder ram 54 mounted on the shaft 48, and a piston rod 56 carries a crossmember 58, from which two parallel guide rods 60 extend through a guide 62 provided on the cylinder 54 to prevent the crossmember from rotating. Adjustably secured on each guide rod 60 is a stop ring 64 which restricts the downwards movement of the crossmember 58; the left-hand stop ring (as viewed in FIG. 2) engages and a closes a limit switch 66 when the crossmember is in its uppermost position as shown.

Each end of the crossmember 58 carries a bearing plate 68 on which two fingers 70 are pivotally mounted in a common vertical plane and are interconnected by a pneumatic piston and cylinder ram 72, as shown in FIG. 1. The two rams 72, which share a common pressure medium supply line 74, are single acting and each serves to spread apart the two associated fingers 70 against the force of a spring (not shown) connecting them together. The pipe 74, like each of the two pipes 76 and 78, which lead to the double-acting ram 54, includes an adjustable throttle by which the speed of the relevant piston can be regulated.

Each finger 70 includes a foot 80 projecting horizontally outwards and having on its upper surface a coating of foam material or the like and which serves as a support for a beaker 10.

A pressure plate or cushion 82 bears down on the bottom of each beaker 10, facing upwards in FIG. 2. The cushion 82 has on its underside a coating of foam material or the like and is mounted on a rod sliding longitudinally in a guide tube 86 and pressed by a spring 84 against the associated beaker 10. Each guide tube 86 is telescopically adjustable and secured on a rod 88 which is in turn secured on the shaft 48.

The apparatus functions in the manner shown in FIGS. 3a to 3g.

Figure 3A:
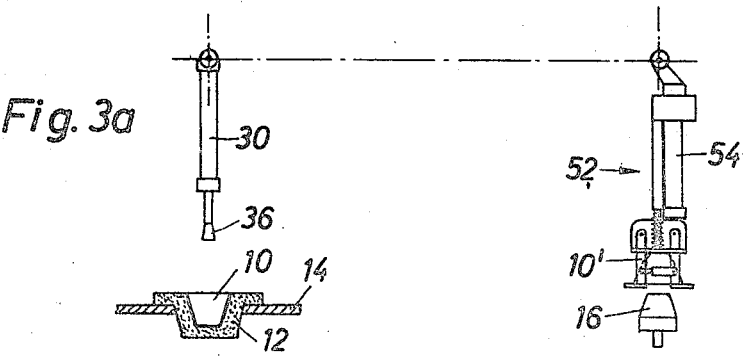
FIGS. 3a to 3g are simplified diagrammatic side views of the apparatus shown in successive positions in the cycle of movement.

FIG. 3a shows the apparatus at a moment when the ram 30, which forms one pivoted arm of the apparatus and carried carries the suction head 36, is situated vertically over a mold 12, in which a beaker 10 rests; while the other pivoted arm 52, with a beaker 10' previously received from the pivot arm 30, is situated over a spindle head 16.

Figure 3B:
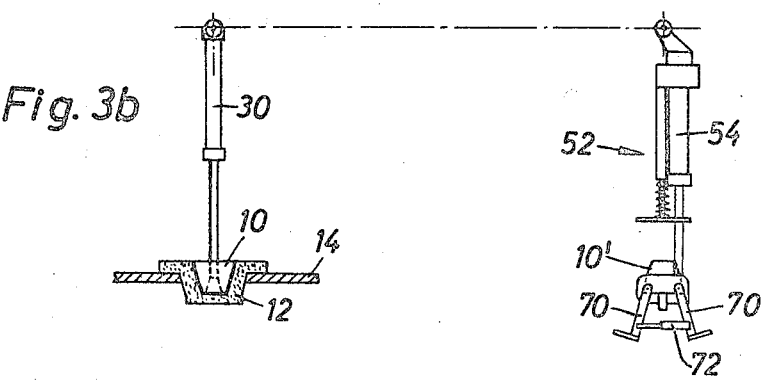

The rams 30 and 54 are next extended downwards, and the suction head 36 enters the beaker 10 and grips it by suction; while the beaker 10 is deposited on the spindle head 16 and the ram 72 actuated to spread the fingers 70 apart and release the beaker, as shown in FIG. 3b.

Figure 3C:
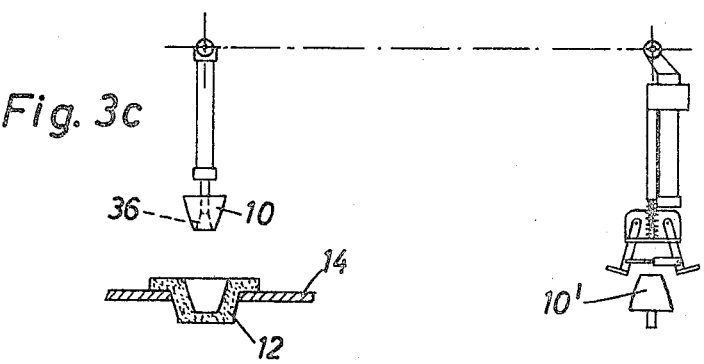

Then, as shown in FIG. 3c, the rams 30 and 54 are retracted and the suction head 36 lifts the beaker 10 from its mold. As soon as the extreme top positions have been reached and the limit switches 40 and 66 have been actuated, the motor 28 operates in such a direction of rotation that the pivot arms 30 and 52 are pivoted towards each other.

Figure 3D:
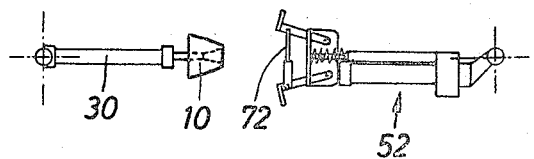
Figure 3E:
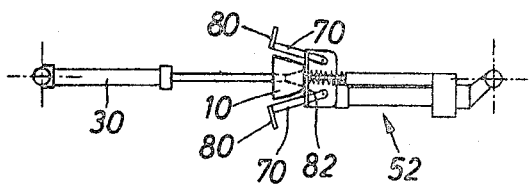
Figure 3F:
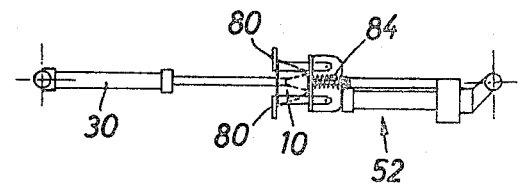
Figure 3G:
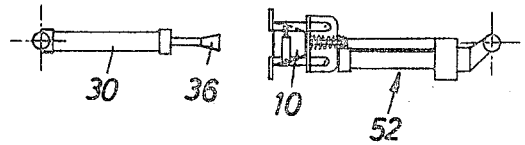

As soon as the pivot arms have reached a horizontal, opposed position as shown in FIG. 3d, one of the two aforesaid limit switches in the reduction gearing 26 actuates the control valve of the ram 30 so that its piston rod is extended and the beaker 10 is pressed against the associated cushion 82. As shown in FIG. 3e, it presses the this back so far to the right against the action of the spring 84 that, after the pressure in the piston-cylinder unit 72 has been shut off, the fingers 70 are able to close (move toward each other) without their feet 80 fouling the beaker. The ram 30 is now retracted, leaving the beaker 10 pressed against the feet 80 by the pressure of the spring 84 acting on the cushion 82, as shown in FIG. 3f, and therefore held firmly by the pivot arm 52.

As soon as the suction head 36 has been fully withdrawn from the beaker 10, the pivot arms 30 and 52 are pivoted back into their vertical position, as shown in FIG. 3a and a new working cycle may begin.

It will be obvious to those skilled in the art that various changes may be made without departing from the scope of the invention and the invention is not to be considered limited to what is shown in the drawings and described in the specification.

I claim:

1. Apparatus for inverting relatively fragile articles such as partially baked ceramic cups, beakers or the like, comprising;
   a support member to which and from which articles are to be conveyed;
   handling means at one end of the support member for engaging a fragile article;
   transfer means at the other end of said support member for receiving an article from said handling means and depositing it at another position;
   said handling means and said transfer means being mounted on spaced, horizontal pivot axes, power means on said support member, operatively connected to said respective handling and transfer means for orienting said means from a vertically depending position where an article is engaged and deposited by the respective means through an arc of substantially 90° to a horizontal position where an article is transferred; and
   said handling and transfer means respectively including article-gripping portions at terminal ends thereof and being disposed in proximate article-exchanging relationship when the respective means are disposed in a horizontal, confronting attitude.

2. The structure as claimed in claim 1 in which said power means includes crank arms pivotally connected to said holding and transfer means, and a link pivotally connected between the respective crank arms.

3. The structure as claimed in claim 2 in which said power means includes a motor mounted on said support member, said handling and transfer means each including a transverse support shaft respectively supporting at least one radially extending support member, each support member on one shaft comprising a fluid motor including a terminal suction element reciprocably supported for movement toward and away from said one shaft for gripping an article disposed in one attitude and for vertically elevating the same, each support member on the other shaft resiliently supporting a base element generally flanked by at least one pivotally mounted gripping finger.

4. The structure as claimed in claim 1 in which said handling means comprises at least one suction head element reciprocally supported for radial movement with respect to the pivot axis of said handling means.

5. The structure as claimed in claim 4 in which said transfer means comprises at least one resiliently supported base element for receiving one surface of an article thereon from sad said suction element, and at least one finger element and having a portion positional in overlying relation thereto whereby an article can be gripped between said base element and said one finger element.

6. The structure as claimed in claim 4 in which said handling means includes a fluid motor including a piston rod portion to which which said suction head element is mounted.

7. The structure as claimed in claim 4 in which said transfer means comprises at least one rod reciprocably supporting a terminal, spring-biased abutment plate, and a fluid-cylinder operated finger element spaced from said abutment plate and positional in spaced overlying overlying relation to said abutment plate.

8. Apparatus for inverting delicate articles such as partially baked ceramic cups, beakers or the like, comprising:
   handling means for engaging and lifting an article;
   transfer means for receiving an article from said handling means and depositing it at another position, the handling means and the transfer means having together inverted the article;
   said transfer means including a holder which comprises an abutment plate arranged to engage a face of the article held by the handling means and to yield resiliently to the pressure thereof; and
   at least one finger adapted to engage behind the opposite face of the article to prevent it from moving away from said abutment plate, the finger being adapted to be swung away from the article for depositing it.

9. The apparatus as claimed in claim 8 in which said handling means comprises at least one suction head element reciprocally supported for lifting an article and subsequently delivering it to the transferring means.